US006181271B1

United States Patent
Hosaka et al.

(10) Patent No.: US 6,181,271 B1
(45) Date of Patent: Jan. 30, 2001

(54) TARGET LOCATING SYSTEM AND APPROACH GUIDANCE SYSTEM

(75) Inventors: Naoki Hosaka, Tokyo; Masaaki Chiba, Yokohama, both of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/141,408

(22) Filed: Aug. 27, 1998

(30) Foreign Application Priority Data

Aug. 29, 1997 (JP) ................................................ 9-234878
Sep. 8, 1997 (JP) ................................................ 9-242832

(51) Int. Cl.$^7$ ............................. G01S 13/66; G01S 13/86
(52) U.S. Cl. ............................... 342/33; 342/34; 342/35; 342/36; 342/55; 342/78
(58) Field of Search ................................. 342/29, 33, 34, 342/35, 36, 52, 55, 59, 78, 95, 96, 97

(56) References Cited

U.S. PATENT DOCUMENTS

| | | | | |
|---|---|---|---|---|
| 3,900,846 | * | 8/1975 | Gibbon et al. | 342/37 |
| 3,934,250 | * | 1/1976 | Martin, Jr. | 342/42 |
| 4,805,015 | * | 2/1989 | Copeland | 348/48 |
| 5,072,396 | * | 12/1991 | Fitzpatrick et al. | 701/217 |
| 5,235,513 | * | 8/1993 | Velger et al. | 701/16 |
| 5,268,680 | | 12/1993 | Zantos . | |
| 5,481,479 | * | 1/1996 | Wight et al. | 701/223 |
| 5,670,961 | * | 9/1997 | Tomita et al. | 342/36 |
| 5,762,292 | * | 6/1998 | Schweyer et al. | 244/3.17 |
| 5,867,256 | * | 2/1999 | Van Rheeden | 356/4.03 |
| 5,983,161 | * | 11/1999 | Lemelson et al. | 701/301 |
| 6,056,237 | * | 5/2000 | Woodland | 244/3.15 |

FOREIGN PATENT DOCUMENTS

| | | | |
|---|---|---|---|
| 899580-A2 | * | 3/1999 | (EP) . |
| 4-70201 | | 3/1992 | (JP) . |
| 5-61963 | | 3/1993 | (JP) . |
| 6-36200 | | 2/1994 | (JP) . |
| 8-21876 | | 1/1996 | (JP) . |
| 11072558 | * | 3/1999 | (JP) . |

OTHER PUBLICATIONS

Bengt–Olof As, et al., IEEE International Radar Conference, Arlington, pp. 22–27, "Selection of Parameters in the Design of a Naval Fire Control Radar", May 7–10, 1990.
Stelios C. A. Thomopoulos, et al., Proceedings of the SPIE—The International Society for Optical Engineering, Sensor Fusion II: Human and Machine Strategies, vol. 1198, pp. 156–169, "Object Tracking From Image Sequences Using Stereo Camera and Range Radar", Nov. 6–9, 1989.
Malcolm A. Burgess, et al., Proceedings of the Digital Avionics Systems Conference, IEEE, no. Conf. 11, pp. 603–610, "Synthetic Vision—A View in the Fog", Oct. 5–8, 1992.
"Conical Scanning System" of "Radar Technology (Section–2)" by the Institute of Electronics and Communications Engineers of Japan, 9$^{th}$ Edition, p93.

* cited by examiner

*Primary Examiner*—John B. Sotomayor
(74) *Attorney, Agent, or Firm*—Oblon, Spivak, McClelland, Maier & Neustadt, P.C.

(57) ABSTRACT

The invention comprises a mulli-wave radar system for obtaining first target position information of a flying object by capturing and tracking the flying object from a maximum detection distance, a stereo-camera system for taking over the tracking of the flying object in the vicinity of a landing point by acquiring the first target position information of the flying object from the milli-wave radar system, and obtaining second target position information having higher precision than the first target position information, and a controller for managing the first target position information of the milli-wave radar system and the second target position information of the stereo-camera system, controlling the milli-wave radar system to capture and track the flying object to the vicinity of the landing point, and controlling the stereo-camera system to capture and track the flying object at the time of landing of the flying object.

24 Claims, 5 Drawing Sheets

TARGET LOCATING SYSTEM AND APPROACH GUIDANCE SYSTEM

BACKGROUND OF THE INVENTION

The present invention relates to a target locating system and an approach guidance system which can be used to exactly guide a flying object to a narrow landing space, for example, in bad weather.

Systems for performing exact target locating include, for example, a radar system and an optical sensor such as a stereo-camera. These systems, however, have the following problems.

The optical sensor has high precision in target locating, but a distance for locating tends to be greatly shortened due to weather, e.g. rain or fog.

On the other hand, the radar system can perform target locating without great influence by weather. However, when target locating is performed with use of a radar system having a low frequency band, a large-sized antenna needs to be used in order to increase angular resolution, because of low frequencies used. In addition, in order to attain a good distance resolution, a method of decreasing a transmission pulse width or a frequency modulation transmission method such as chirp modulation needs to be used. In either method, however, it is necessary to increase the frequency band width. If the frequencies employed are low, it becomes difficult to maintain the frequency band width.

As stated above, the conventional target locating systems are inevitably influenced by weather and can hardly perform exact target locating.

A conical tracking radar system, for example, may be used as target locating system. An antenna apparatus used in the conical tracking radar system comprises a primary horn for radiating an antenna beam and a reflector, situated opposite to the radiation face of the primary horn, for reflecting the antenna beam and emitting it to the outside. The antenna beam radiated by the primary horn is rotated about the antenna visual line and scanned conically. In this case, the antenna apparatus is rotated, with the primary horn being angularly offset from the antenna visual line.

The primary horn of the antenna apparatus is provided with a rotary drive mechanism. This drive mechanism becomes an obstruction to block the antenna beam reflected from the reflector, resulting in a decrease in antenna efficiency.

Moreover, a structure such as a rotary joint for rotating the primary horn needs to be provided midway along a feed line. The use of the rotary joint causes mixing of noise in the antenna beam, variation in amplitude and phase, etc., thus considerably degrading the quality of the antenna beam. These drawbacks become conspicuous as the frequencies used become higher. Furthermore, if that portion of the feed line serving as electric wave propagation path, at which the rotary joint is provided, is mechanically rotated, the feed line, for example, may be broken. Thus, the reliability of the feed line itself, that is, the reliability of the system, may deteriorate.

BRIEF SUMMARY OF THE INVENTION

An object of the present invention is to provide a target locating system and an approach guidance system capable of preventing the distance for locating from greatly decreasing due to weather, etc. and performing exact target locating in the vicinity of a landing point.

Another object of the invention is to provide a conical scan type antenna system capable of preventing the antenna efficiency and antenna beam quality from greatly decreasing, thus enhancing the reliability of the system.

According to an aspect of the invention, there is provided a target locating system comprising:

a milli-wave radar system for obtaining first target position information of a flying object being about to land, by capturing and tracking the flying object from a maximum detection distance;

a stereo-camera system for taking over the tracking of the flying object in the vicinity of a landing point by acquiring the first target position information of the flying object from the milli-wave radar system, and obtaining second target position information having higher precision than the first target position information; and a controller for managing the first target position information of the milli-wave radar system and the second target position information of the stereo-camera system, controlling the milli-wave radar system to capture and track the flying object to the vicinity of the landing point, and controlling the stereo-camera system to capture and track the flying object at the time of landing of the flying object.

With the above structure, the flying object being about to land is captured and tracked by the milli-wave radar system, which is less susceptible to weather, etc., in a range between a maximum detection distance of the milli-wave radar system and the vicinity of the landing point, and the flying object is, in turn, captured and tracked by the stereo-camera system with high locating precision at the landing point.

Thus, the locating distance for the flying object being about to land is less decreased due to weather, etc., and exact target locating can be carried out in the vicinity of the landing point.

According to another aspect of the invention, there is provided an approach guidance system comprising:

a target locating system including a milli-wave radar system for obtaining first target position information of a flying object being about to land, by capturing and tracking the flying object from a maximum detection distance, a stereo-camera system for taking over the tracking of the flying object in the vicinity of a landing point by acquiring the first target position information of the flying object from the milli-wave radar system, and obtaining second target position information having higher precision than the first target position information, and a controller for managing the first target position information of the milli-wave radar system and the second target position information of the stereo-camera system, controlling the milli-wave radar system to capture and track the flying object to the vicinity of the landing point, and controlling the stereo-camera system to capture and track the flying object at the time of landing of the flying object; and a control apparatus for guiding the flying object which is a target to the vicinity of the landing point on the basis of the first target position information output from the milli-wave radar system of the target locating system, and guiding the flying object to the landing point on the basis of the second target position information output from the stereo-camera system of the target locating system.

With this structure, the target position information of the flying object obtained by the milli-wave radar system and the target position information of the flying object obtained by the stereo-camera system is transmitted to the control apparatus. Thus, the control apparatus guides the flying object to the vicinity of the landing point, using the target position information from the milli-wave radar system which is less susceptible to weather, etc. In the vicinity of the landing point, the control apparatus guides the flying object to the landing point, using the target position information from the stereo-camera system with high location precision.

Accordingly, the flying object can be exactly guided to the landing point, without influence of weather, etc.

According to still another aspect of the invention, there is provided a conical scan type antenna system connected to a transmission/reception system and comprising a primary radiator for transmitting and receiving an antenna beam and a reflector, situated opposite to a radiation surface of the antenna beam of the primary radiator, for reflecting the antenna beam, wherein the reflector is angularly offset from an antenna visual line to incline the antenna beam, and the reflector is rotated about the antenna visual line to conically scan the antenna beam.

In the above structure, it is preferable that the feed line from the transmission/reception system to the primary radiator does not pass through the rotary mechanism for the reflector.

According to the above structure, the reflector is rotated to conically scan the antenna beam, and the feed line from the transmission/reception system to the primary radiator does not pass through the rotary mechanism for the reflector.

As a result, there is no need to drive the primary radiator and feed line, and a degradation in quality of the antenna beam caused by this driving can be prevented. Therefore, stable transmission/reception of the beam is achieved.

Since the feed line is fixed between the transmission/reception system and primary radiator and is not driven or rotated. Thus, the reliability of the whole system is enhanced.

Only the primary radiator and feed line are disposed in front of the reflection surface of the reflector. Thus, the antenna beam reflected by the reflector is prevented from being blocked by an obstruction, and the antenna efficiency is less degraded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Embodiments of the present invention will now be described in detail with reference to the accompanying drawings.

Figure 1:
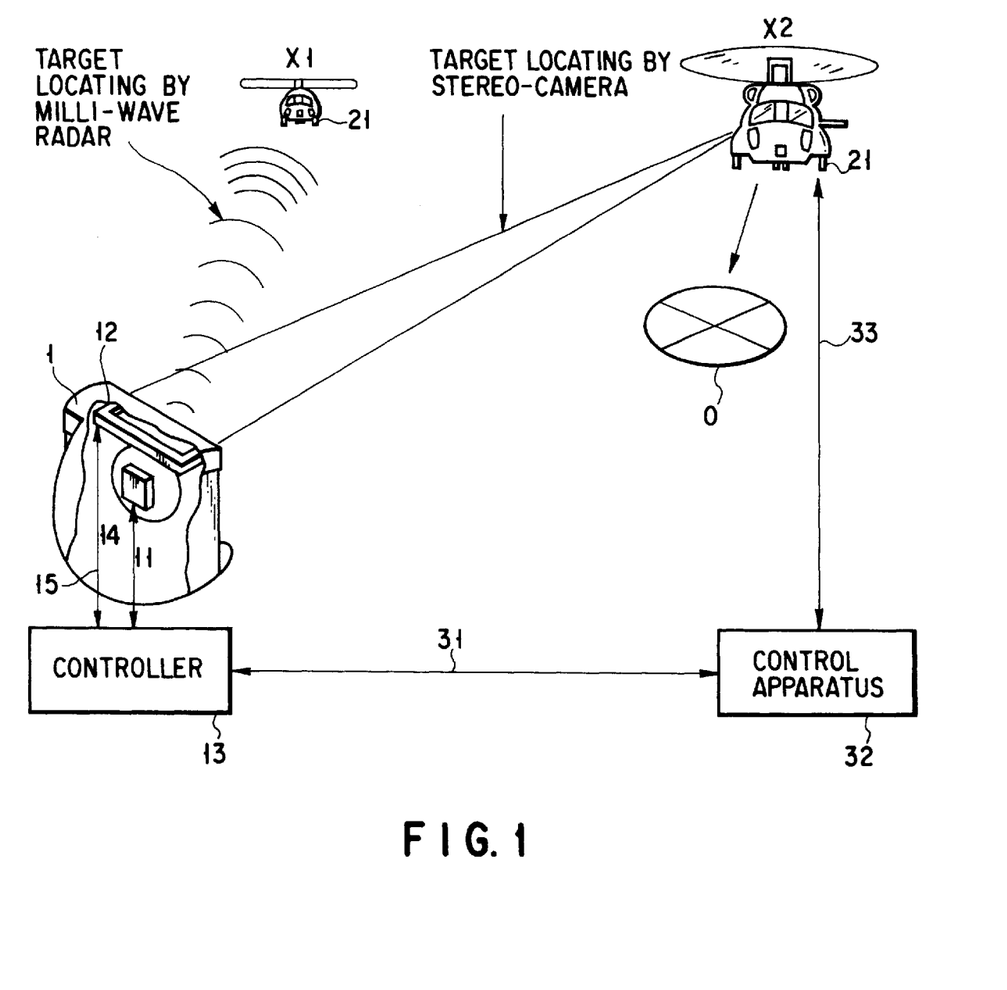
FIG. 1 is a system construction view showing a target locating system and an approach guidance system according to an embodiment of the present invention.

FIG. 1 is a system construction view showing a target locating system and an approach guidance system according to an embodiment of the present invention.

In FIG. 1, reference numeral 11 denotes a milli-wave radar system. The milli-wave radar system 11 captures and tracks a target or a flying object 21 (a helicopter in FIG. 1) being present within a maximum detection range (a location X1 in FIG. 1). Reference numeral 12 denotes a stereo-camera system and captures and tracks the flying object 21 being present near a landing point (at a location X2 in FIG. 1). The milli-wave radar system 11 and stereo-camera system 12 are disposed within, e.g. a housing body 1 having a gimbal structure.

The milli-wave radar system 11 receives a signal reflected from the target or flying object 21 and delivers it to a controller 13 as target position information. Similarly, the stereo-camera system 12 receives a signal reflected by the flying object 21 and delivers it to the controller 13 as target position information. The controller 13 manages target position information output from the milli-wave radar system 11 and stereo-camera system 12. Based on the target position information, the controller 13 controls the milli-wave radar system 11 to capture and track the flying object 21 to the vicinity of landing point 0 and also controls the stereo-camera system 12 to capture and track the flying object 21 at the time of landing of flying object 21. The target position information is transmitted to a control apparatus 32 from the controller 13 over a line 31.

Based on the target position information from the milli-wave radar system 11, the control apparatus 32 guides the flying object 21 to the vicinity of landing point O. In the vicinity of landing point O, the control apparatus 32 controls the flying object 21 on the basis of target position information from the stereo-camera system 12 so that the object 21 may land on the small-space landing point O. In this case, the control apparatus 32 delivers flight instructions of speech information, etc. to the flying object 21 over a line 33, e.g. a wireless channel.

The milli-wave radar system 11, stereo-camera system 12 and controller 13 constitute a target locating system of the present invention. Furthermore, the target locating system is combined with the control apparatus 32 to constitute an approach guidance system of the present invention.

Figure 2A:
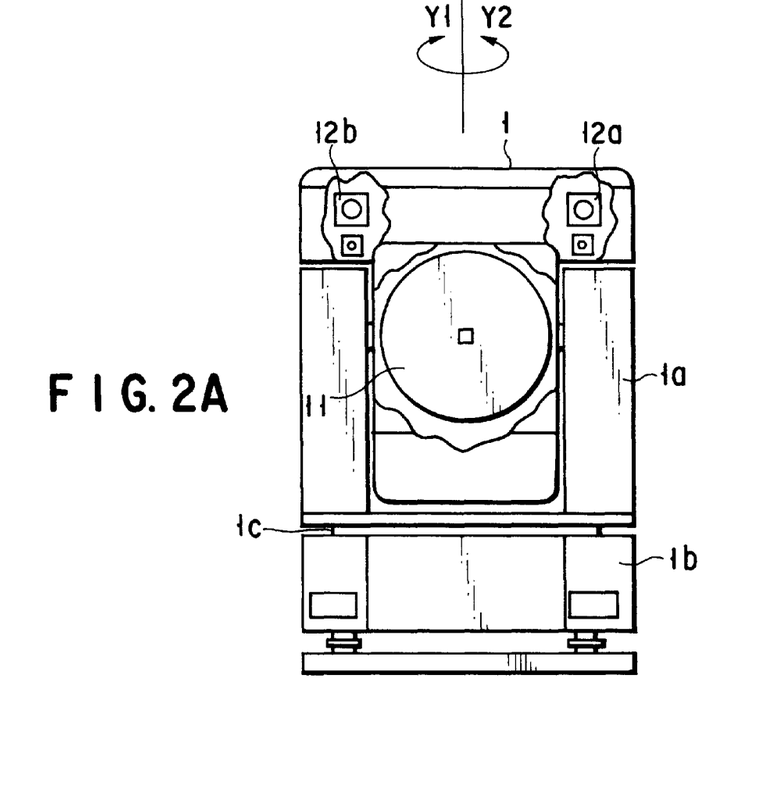
FIG. 2A and FIG. 2B are cross-sectional views for describing the housing body in the embodiment in detail.
Figure 2B:
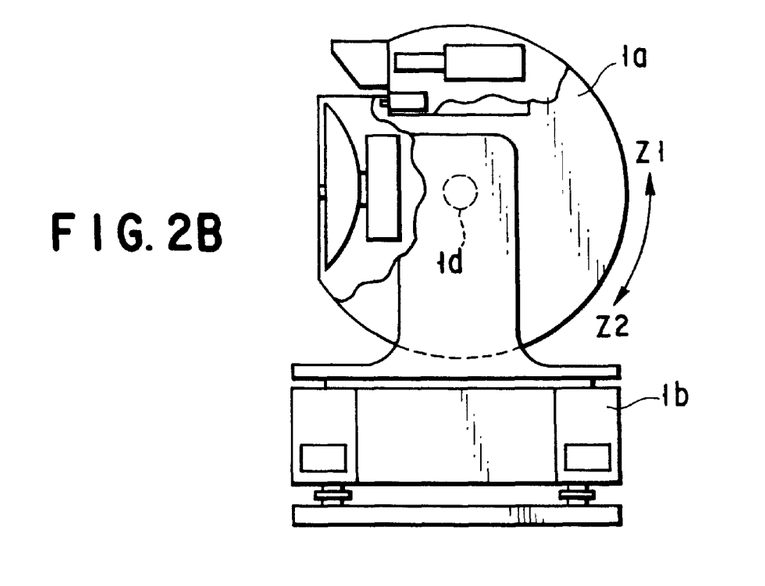

As is shown in FIGS. 2A and 2B, the housing body 1 comprises a movable first housing portion 1a and an immovable second housing portion 1b. The first housing portion 1a can be rotated by a rotary portion 1c in a direction of double-headed arrow Y1–Y2, as shown in FIG. 2A, and can be rotated by a rotary portion Id in a direction of double-headed arrow Z1–Z2, as shown in FIG. 2B. Thus, the first housing portion 1a is rotated by the rotary portion 1c, 1d in the direction Y1–Y2 or Zl–Z2 in FIGS. 2A and 2B so that the milli-wave radar system 11 and stereo-camera system 12 may capture and track the flying object 21 which is moving.

Figure 3:
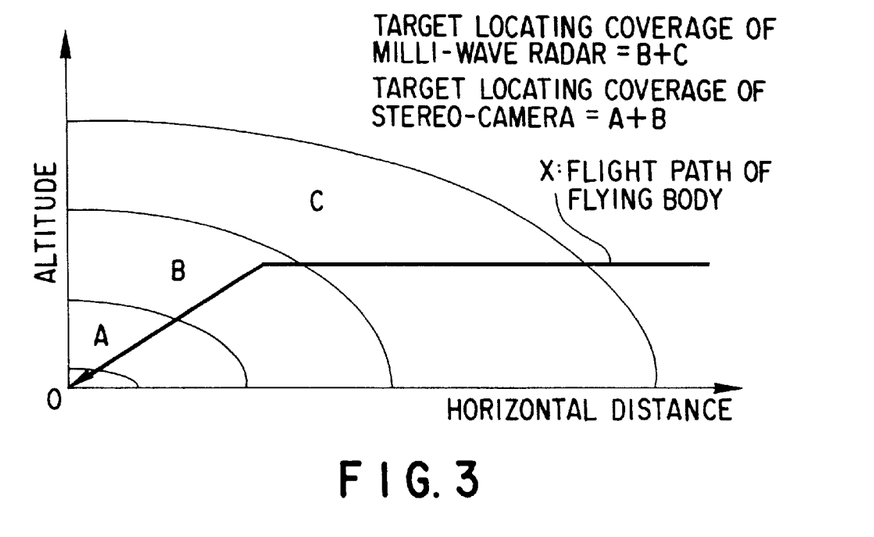
FIG. 3 shows a relationship between a target locating coverage of a milli-wave radar system and a stereo-camera system and an approach route of a flying object in the embodiment.
Figure 4:
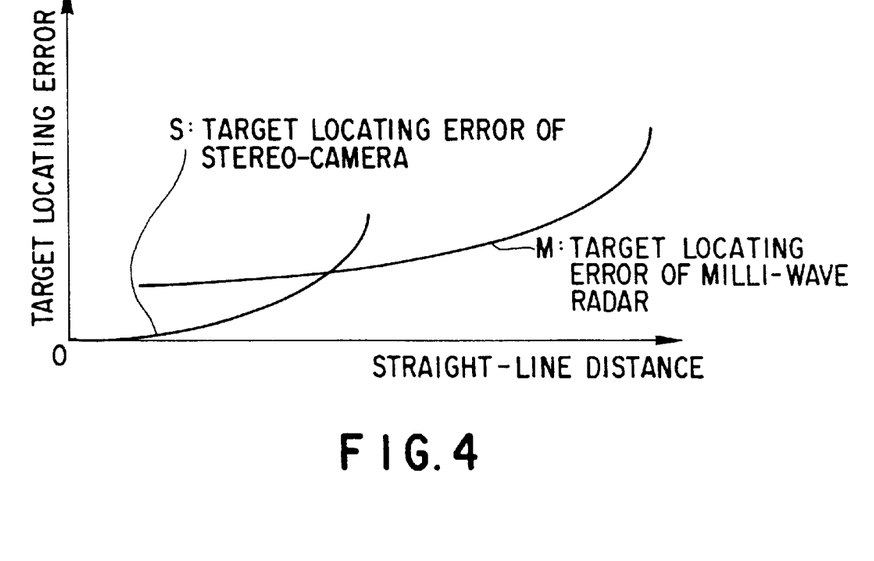
FIG. 4 shows a relationship between a target locating precision of the milli-wave radar system and stereo-camera system and a straight-line distance to the target.

FIG. 3 shows a relationship between a target locating coverage of the milli-wave radar system 11 and stereo-camera system 12 and an approach route of flying object 21. FIG. 4 shows a relationship between a target location error of the milli-wave radar system 11 and stereo-camera system 12 and a straight-line distance to the target.

In FIG. 3, the vertical axis indicates the altitude of the target and the horizontal axis indicates a horizontal distance from, e.g. the landing point O to the target. In FIG. 3, symbol X indicates a flight path of the flying body 21 from point X1 to point X2, as shown in FIG. 1.

In FIG. 4, the vertical axis indicates a target location error and the horizontal axis indicates a straight-line distance from, e.g. the landing point 0 to the target. Symbol M indicates a target location error of the milli-wave radar system 11 in relation to the straight-line distance, and symbol S a target location error of the stereo-camera system 12 in relation to the straight-line distance.

Specifically, the target locating coverage of the milli-wave radar system 11, as shown in FIG. 3, reaches farther than that of the stereo-camera system 12. The locating coverage of the milli-wave radar system 11 is less influenced by rain, fog, etc. than that of the stereo-camera system 12.

On the other hand, as shown in FIG. 4, the target location error of the stereo-camera system 12 is less than that of the milli-wave radar system 11 in a close range (near landing point O). Accordingly, the flying object 21 can be guided to exactly land on the smallspace landing point O. In addition, the stereo-camera system 12 is not greatly influenced by rain, fog, etc. in the close range.

Since the milli-wave radar system 11 has a transmission blind period (i.e. a reception halt period in a transmission pulse emission period), the minimum detection distance cannot be reduced to a level of the stereo-camera system 12.

In the present invention, therefore, the milli-wave radar system 11, which is less susceptible to rain, fog, etc., is used in a far range, and the stereo-camera system 12, which has a less target location error, is used in the close range just before the landing. These systems 11 and 12 are switched so as to make use of their merits and compensate their demerits.

The operation of the embodiment including the milli-wave radar system 11 and stereo-camera system 12 will now be described with reference to FIG. 3.

At the beginning of guidance, the controller 13 delivers position information of the flying object 21 to the milli-wave radar system 11 over the line 14. Normally, the position information of the flying object 21 to be transmitted by the controller 13 is delivered to the controller 13 from the control apparatus 32, which acquires over the line 33 the self-position information of the flying object 21 acquired by a navigation system (not shown), etc. Alternatively, the position information is acquired by another long-distance sensor (not shown).

If the flying object 21 has entered the target locating coverage C, the milli-wave radar system 11 captures the object 21 and starts to track it. The system 11 continuously locates the flying object 21 and transmits a locating result to the controller 13 over the line 14 as target position information. The target position information is then transmitted to the control apparatus 32 over the line 31.

Based on the input target position information, the control apparatus 32 issues a flight instruction to the flying object 21 over the line 33. At this time, the locating result of the milli-wave radar system 11 is transmitted to the stereo-camera 12, too, over the line 15 as target position information. The stereo-camera system 12, however, does not start tracking since the object 21 is out of the locating coverage.

If the flying object 21 has entered the locating coverage B, the stereo-camera system 12 starts detection. The target position information detected by the stereo-camera system 12 is transmitted to the controller 13 over the line 15. The controller 13 correlates the target position information transmitted from the stereo-camera system 12 with the information of the flying object 21 which has been tracked by the milli-wave radar system 11 thus far. If a high correlation result is obtained, the locating result to be adopted is switched to that of the stereo-camera system 12 and this locating result is delivered to the control apparatus 32 as target position information.

The series of these operations (switching of locating result) are normally carried out while the flying object 21 is being present in the coverage B in which the locating coverage (B+C in FIG. 3) of the milli-wave radar system 11 overlaps the locating coverage (A+B in FIG. 3) of the stereo-camera system 12.

Subsequently, using the target position information obtained by the stereo-camera system 12, the control apparatus 32 guides the flying object 21 to the landing point 0. Even if the tracking by the stereo-camera system 12 is locked off due to, e.g. temporary shut-off of the visual field of the camera, if the flying object 21 is being in the coverage B, the milli-wave radar system 11 continues the tracking. Thus, the target position information obtained by the milli-wave radar system 11 may be used for supplementation. Accordingly, after the temporary shut-off of the visual field has ended, the stereo-camera system 12 can track the object 21 once again, following the above procedures.

If the flying object 21 is present in the coverage A, latest target position information cannot be obtained by the milli-wave radar system 11. However, the object 21 may be recaptured by continuing prediction of the target position on the basis of the target position information and movement information obtained at the time the tracking of the stereo-camera system 12 is locked off. In this case, since the flying object 21 is in the close range, the precision in prediction is very high. Needless to say, however, the minimum detection distance of the milli-wave radar system 11 should desirably be reduced as small as possible. Besides, if the flying object 21 has a hovering function, as in the case of a helicopter, it is one way to make the flying object 21 remain at the same position in the air until the temporary shut-off of the visual field of the stereo-camera system 12 will end.

Figure 5:
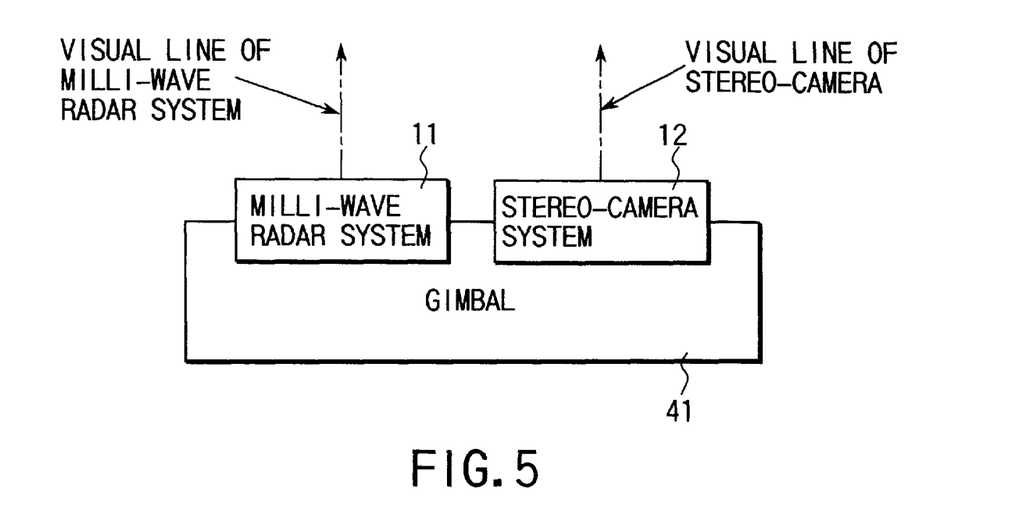
FIG. 5 shows a state in which the milli-wave radar system and the stereo-camera system are mounted on a single gimbal in the embodiment.

In FIGS. 2A, 2B and 5, the milli-wave radar system 11 and stereo-camera system 12 are mounted on the single gimbal 41.

In this case, the milli-wave radar system 11 and stereo-camera system 12 have a constant positional relationship and the same visual line direction. Thus, a displacement in angular reference axes of both systems 11 and 12 is small, and the precision in target tracking switching is high. Even if there is a positional error in disposition of the milli-wave radar system 11 and stereo-camera system 12, such a positional error is invariable and may be geometrically corrected, and then the systems 11 and 12 may be used.

In the above embodiment, the milli-wave radar system 11 and stereo-camera system 12 may be mounted at different locations within the housing body 1. In this case, however, the milli-wave radar system 11 and stereo-camera system 12 have respective angular references and an error will occur between the angular references. Consequently, it becomes difficult to find a good correlation in target position information at the time of target tracking switching. It is desirable, therefore, to mount the milli-wave radar system 11 and stereo-camera system 12 on the same gimbal 41.

Figure 6:
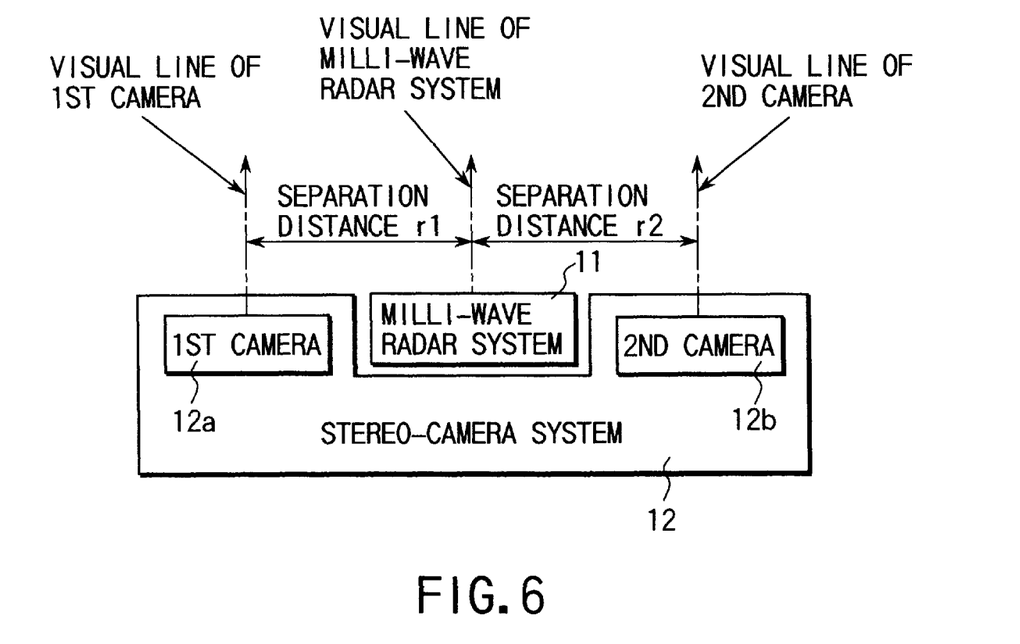
FIG. 6 shows a state in which the milli-wave radar system is interposed between first and second cameras of a stereo-camera system according to a second embodiment of the invention.

FIG. 6 shows a second embodiment of the invention.

In FIG. 6, the stereo-camera system 12 comprises at least a first camera 12a and a second camera 12b. The distance between the first and second cameras 12a and 12b and the target can be calculated by using the theory of triangulation, if a separation distance between the first and second cameras 12a and 12b and the target directions (angles) to the same target are found. The target angles are found by the function of the camera itself. Based on these data, the stereo-camera 12 can perform target location.

The separation distance between the first and second cameras 12a and 12b in the stereo-camera system is sufficiently less than the target locating distance. It can be said from the theory of triangulation that the precision in measuring distance increases as the separation distance is larger. If the separation distance between the first and second cameras 12a and 12b is increased in order to enhance the precision in measuring distance, the size of the entire system including the milli-wave radar system increases.

Considering this problem, in the second embodiment, the first and second cameras 12a and 12b are arranged symmetrical with respect to the milli-wave radar system 11. Thereby, the space for installation is reduced while the precision in measuring distance is maintained. Thus, the target locating system can be reduced in size and the precision in measuring distance can be enhanced.

Theoretically, if the visual line of the first camera 12a and that of the second camera 12b are made symmetrical with respect to the visual line of the milli-wave radar system 11 (r1=r2), the visual line of the stereo-camera system 12 coincides with that of the milli-wave radar system 11. Thus, an error in target locating results of the milli-wave radar system 11 and stereo-camera system 12 due to a displacement of visual lines of the milli-wave radar system 11 and stereo-camera system 12 is reduced.

A third embodiment of the present invention will now be described with reference to FIG. 7. In the third embodiment, a conical tracking system is adopted in the milli-wave radar system 11. In the preceding embodiments, the target locating system for the milli-wave radar system 11 is not specified.

Figure 7:
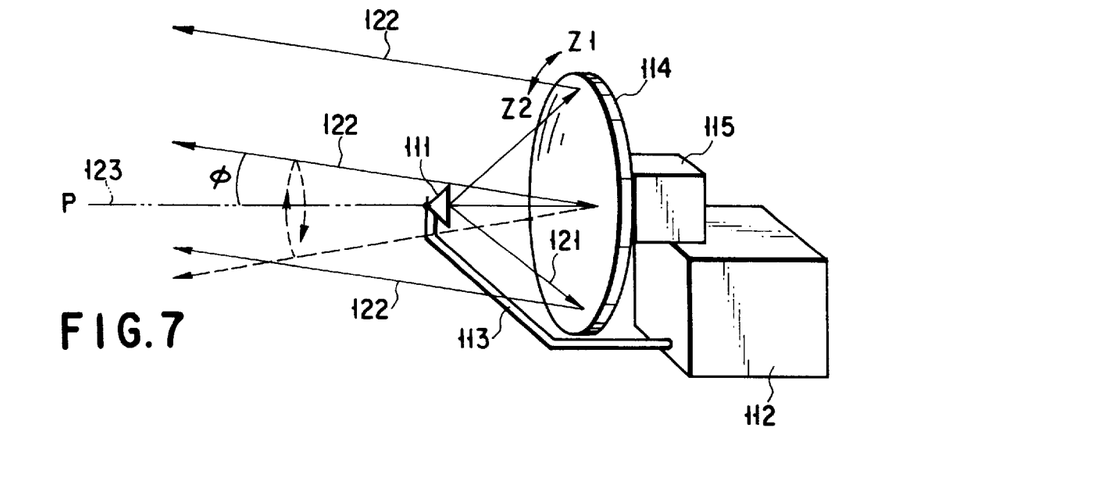
FIG. 7 shows a third embodiment of the invention, wherein a conical tracking system is adopted as a target tracking system of the milli-wave radar system.

In FIG. 7, reference numeral 111 is a primary horn serving as a primary radiator. The primary horn 111 is connected over a feed line 113 to a transmission/reception system 112 including a transmitter and a receiver. The primary horn 111 emits and receives an antenna beam. Reference numeral 114 denotes a reflector, e.g. a parabolic reflector. The reflector 114 is situated opposed to a radiation surface of an antenna beam radiated by the primary horn 111, and reflects the antenna beam. The reflector 114 is selectively rotated in directions Z1 and Z2 by an antenna drive system 115 disposed in rear of the reflector 114. The primary horn 111 and reflector 114 are arranged so that the centers of their mutually opposed faces may substantially coincide.

In operation a transmission signal produced by the transmitter (not shown) in the transmission/reception system 112 is supplied to the primary horn 111 over the feed line 113. The primary horn 111 radiates the transmission signal to the reflector 114 as a beam 121. An antenna beam 122 reflected by the reflector 114 is radiated to the space.

On the other hand, at the time of reception, a reception signal received by the primary horn 111 is supplied, in a reverse direction to the transmission mode, to the receiver (not shown) in the transmission/reception system 112 over the feed line 113.

Figure 8:
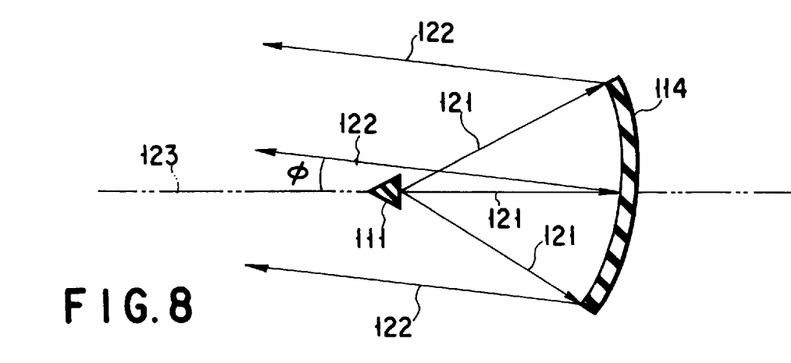
FIG. 8 is a cross-sectional view for describing the inclination of the antenna beam in the third embodiment.

As is shown in FIG. 8, the reflector 114 is inclined such that the antenna beam 122 is offset by an angle $\phi$ with respect to the antenna visual line 123 (indicated by a two-dot-and-dash line in FIGS. 7 and 8). If the reflector 114 is rotated by the antenna drive system 115 about the antenna visual line 123, the antenna beam 122 describes a conical locus at an angle $\phi$ with respect to the center axis or the antenna visual line 123. In other words, the antenna beam 122 is scanned conically.

On the other hand, the feed line 113 from the transmission/reception system 112 to the primary horn 111 is extended from the outside of the reflector 114 to the reflection surface of the reflector 114 without passing through the antenna drive system 115. Since the transmission/reception system 112 is disposed near the antenna drive system 115 on the rear side of the reflector 114, the feed line 113 reaches the primary horn 111 from the transmission/reception system 112, passing by the periphery of the reflector 114.

According to the above embodiment, the conical scan of the antenna beam 122 is achieved by rotating the reflector 114, and the feed line 113 is made to extend from the transmission/reception system 112 to the primary horn 111, without passing through the antenna drive system 115. The primary horn 111, transmission/reception system 112 and feed line 113 are fixed as a beam generation source. As a result, unlike the prior art, the primary horn 111 and feed line 113 may not be provided with a rotary drive mechanism and a rotary joint etc. Thus, the factors of degrading the quality such as noise mixing, amplitude variation, or phase variation which are provided to antenna beam 122 by the rotary drive mechanism and rotary joint will be eliminated. Accordingly, stable transmission/reception of the beam can be achieved.

In addition, the feed line 113 can be used in a fixed state between the transmission/reception system 112 and primary horn 111, for example, without rotating the feed line 113. Thus, the feed line 113 itself may not be damaged, and the reliability of the entire system can be enhanced.

Furthermore, only the primary horn 111 and feed line 113 are disposed on the front side of the reflection surface of the reflector 114. Thus, the antenna beam 122 reflected from the reflector 114 is less blocked by, e.g. an obstruction, and the antenna efficiency is less deteriorated.

Figure 9:
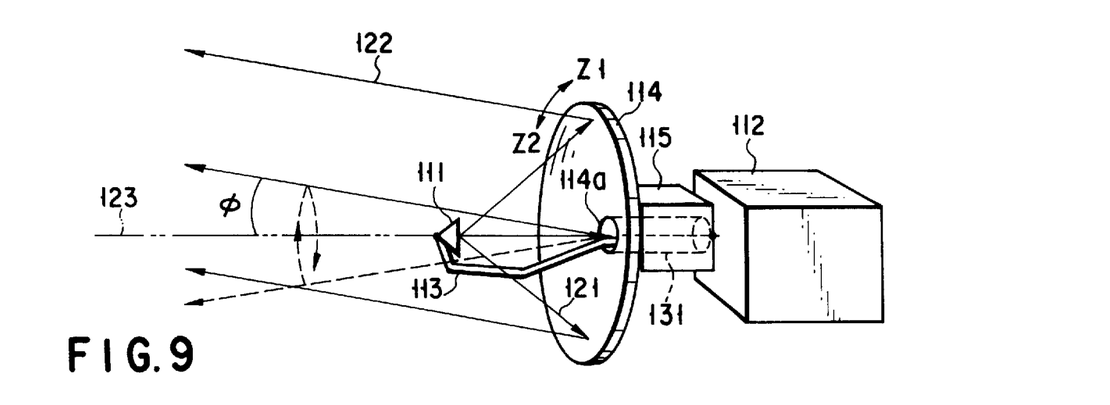
FIG. 9 shows a fourth embodiment of the invention, wherein a conical tracking system is adopted as a target tracking system of the milli-wave radar system.

FIG. 9 shows a fourth embodiment of the present invention.

In FIG. 9, the parts common to those in FIG. 7 are denoted by like reference numerals. The reflector 114 has a through-hole 131 at a central portion 114a corresponding to its rotational axis. The through-hole 131 extends from the reflector 114 to the antenna drive system 115. The feed line 113 extending from the transmission/reception system 112 to the primary horn 111 is passed through the through-hole 131.

This structure is advantageous when the transmission/reception system 112 needs to be disposed behind the reflector 114 and antenna drive system 115 because of limitations to the disposition of the parts, or when the space for the feed line 113 cannot be provided around the reflector 114.

According to the fourth embodiment, the through-hole 131 is formed at the rotational axis of the reflector 114, and the feed line 113 extending from the transmission/reception system 112 to the primary horn 111 is passed through the through-hole 131. Thus, the same advantage as with the preceding embodiments can be obtained without interference with the rotation of the reflector 114. Moreover the size of the system can be reduced.

Even in a case where the length of the feed line 113 is limited, the feed line 113 may be passed through the through-hole 131 formed in the reflector 114 and antenna drive system 115, thus same advantage can be obtained.

Needless to say, the driving system of the antenna drive system 115 in each of the above embodiments may be modified without departing from the spirit of the invention.

In the third embodiment, the milli-wave radar system 11 may be replaced with an electronic scan type antenna and the stereo-camera system 12 may be modified to have a wide field of view. As a result, the gimbal mechanism is dispensed with and the whole sensor can be fixed. Therefore, the precision in target locating can be enhanced.

In the third embodiment, the target tracking system for the milli-wave radar system 11 may be freely chosen, and different advantages may be obtained by the chosen system. The wavelength band used in the stereo-camera system 12 may be freely chosen, depending on the environment of use.

As has been described above, according to each of the embodiments, the flying object 21 being about to land is captured and tracked by the milli-wave radar system 11, which is less susceptible to weather, etc., in a range between a maximum detection distance of the milli-wave radar system 11 and the vicinity of the landing point O, and the flying object 21 is, in turn, captured and tracked by the stereo-camera system 12 with high locating precision at the landing point O.

Accordingly, the locating distance for the flying object 21 being about to land is less decreased due to weather, etc., and exact target locating can be carried out in the vicinity of the landing point.

The target position information of the flying object 21 obtained by the milli-wave radar system 11 and the target position information of the flying object 21 obtained by the stereo-camera system 12 is transmitted to the control apparatus 32 via the controller 13. Thus, the control apparatus 32 guides the flying object 21 to the vicinity of the landing point O, using the target position information from the milli-wave radar system 11 which is less susceptible to weather, etc. In the vicinity of the landing point O, the control apparatus 32 guides the flying object 21 to the landing point O, using the target position information from the stereo-camera system 12 with high location precision.

Accordingly, the flying object 21 can be exactly guided to the landing point, without influence of weather, etc.

The milli-wave radar system 11 and stereo-camera system 12 are mounted on the same gimbal 41. Alternatively, making use of the structural feature that the stereo-camera system 12 comprises the first camera 12a and second camera 12b, the first and second cameras 12a and 12b are arranged symmetrical with respect to the milli-wave radar system 11. Thereby, the displacement in angular reference axes of both systems 11 and 12 is reduced, and the precision in switching the target tracking mode is enhanced.

The target tracking system of the milli-wave radar system 11 may be variously modified, for example, by adopting the conical tracking system. Thus, the transmission/reception system can be simplified, and the whole system can be reduced in size, weight and cost. If the milli-wave radar system 11 is replaced with the electronic scan type antenna and the stereo-camera system 12 is modified to have a wide field of view, a desired locating coverage can be achieved without using the gimbal mechanism.

In each of the above embodiments, the target detection probability or locating precision may be enhanced by providing the flying object 21 with a corner reflector for milli-wave radar or a marker for stereo-camera, which serves as a locating reference means.

The present invention is not limited to the above embodiments and, needless to say, various modifications may be made without departing from the spirit of the invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A target locating system comprising:
    a milli-wave radar system for obtaining first target position information of a flying object being about to land, by capturing and tracking the flying object from a maximum detection distance;
    a stereo-camera system for taking over the tracking of the flying object in the vicinity of a landing point by acquiring the first target position information of the flying object from the milli-wave radar system, and obtaining second target position information having higher precision than the first target position information; and
    a controller for managing the first target position information of the milli-wave radar system and the second target position information of the stereo-camera system, controlling the milli-wave radar system to capture and track the flying object to the vicinity of the landing point, and controlling the stereo-camera system to capture and track the flying object at the time of landing of the flying object.

2. The target locating system according to claim 1, wherein the milli-wave radar system and the stereo-camera system are mounted on a single gimbal structure.

3. The target locating system according to claim 1, wherein the stereo-camera system comprises at least first and second cameras, and the first and second cameras are arranged symmetrical with respect to the milli-wave radar system.

4. The target locating system according to claim 2, wherein the stereo-camera system comprises at least first and second cameras, and the first and second cameras are arranged symmetrical with respect to the milli-wave radar system.

5. The target locating system according claim 1, wherein a target tracking system of the milli-wave radar system is a conical tracking system.

6. The target locating system according to claim 1, wherein a target tracking system of the milli-wave radar system is an antenna rotary type conical tracking system.

7. The target locating system according to claim 1, wherein the milli-wave radar system is an electronic scan type antenna and the stereo-camera system has a wide field of view.

8. The target locating system according to claim 1, wherein the milli-wave radar system is a conical scan type antenna system connected to a transmission/reception system and comprising a primary radiator for transmitting and receiving an antenna beam and a reflector, situated opposite to a radiation surface of the antenna beam from the primary radiator, for reflecting the antenna beam, wherein the reflector is angularly offset from an antenna visual line to incline the antenna beam, and the reflector is rotated about the antenna visual line to conically scan the antenna beam.

9. The target locating system according to claim 8, wherein a feed line extending from the transmission/reception system to the primary radiator avoids passing through a rotary unit for rotating the reflector.

10. The target locating system according to claim 8, wherein a feed line extending from the transmission/reception system to the primary radiator is passed from the outside of the reflector to a reflection surface of the reflector, such that the feed line may not interfere with rotation of the reflector.

11. The target locating system according to claim 8, wherein the transmission/reception system is disposed behind a rear face of the reflector, and a feed line extending from the transmission/reception system to the primary radiator is passed from the transmission/reception system to a reflection surface of the reflector beyond a peripheral portion of the reflector.

12. The target locating system according to claim 8, wherein the reflector has a through-hole at a rotational axis thereof, and a feed line extending from the transmission/reception system to the primary radiator is passed from the transmission/reception system to the primary radiator through the through-hole.

13. An approach guidance system comprising:
a target locating system including a milli-wave radar system for obtaining first target position information of a flying object being about to land, by capturing and tracking the flying object from a maximum detection distance, a stereo-camera system for taking over the tracking of the flying object in the vicinity of a landing point by acquiring the first target position information of the flying object from the milli-wave radar system, and obtaining second target position information having higher precision than the first target position information, and a controller for managing the first target position information of the milli-wave radar system and the second target position information of the stereo-camera system, controlling the milli-wave radar system to capture and track the flying object to the vicinity of the landing point, and controlling the stereo-camera system to capture and track the flying object at the time of landing of the flying object; and
a control apparatus for guiding the flying object which is a target to the vicinity of the landing point on the basis of the first target position information output from the milli-wave radar system of the target locating system, and guiding the flying object to the landing point on the basis of the second target position information output from the stereo-camera system of the target locating system.

14. The approach guidance system according to claim 13, wherein the milli-wave radar system and the stereo-camera system are mounted on a single gimbal structure.

15. The approach guidance system according to claim 13, wherein the stereo-camera system comprises at least first and second cameras, and the first and second cameras are arranged symmetrical with respect to the milli-wave radar system.

16. The approach guidance system according to claim 14, wherein the stereo-camera system comprises at least first and second cameras, and the first and second cameras are arranged symmetrical with respect to the milli-wave radar system.

17. The approach guidance system according to claim 13, wherein a target tracking system of the milli-wave radar system is a conical tracking system.

18. The approach guidance system according to claim 13, wherein a target tracking system of the milli-wave radar system is an antenna rotary type conical tracking system.

19. The approach guidance system according to claim 13, wherein the milli-wave radar system is an electronic scan type antenna and the stereo-camera system has a wide field of view.

20. The approach guidance system according to claim 14, wherein the milli-wave radar system is a conical scan type antenna system connected to a transmission/reception system and comprising a primary radiator for transmitting and receiving an antenna beam and a reflector, situated opposite to a radiation surface of the antenna beam from the primary radiator, for reflecting the antenna beam, wherein the reflector is angularly offset from an antenna visual line to incline the antenna beam, and the reflector is rotated about the antenna visual line to conically scan the antenna beam.

21. The approach guidance system according to claim 20, wherein a feed line extending from the transmission/reception system to the primary radiator avoids passing through a rotary unit for rotating the reflector.

22. The approach guidance system according to claim 20, wherein a feed line extending from the transmission/reception system to the primary radiator is passed from the outside of the reflector to a reflection surface of the reflector, such that the feed line may not interfere with rotation of the reflector.

23. The approach guidance system according to claim 20, wherein the transmission/reception system is disposed behind a rear face of the reflector, and a feed line extending from the transmission/reception system to the primary radiator is passed from the transmission/reception system to a reflection surface of the reflector beyond a peripheral portion of the reflector.

24. The approach guidance system according to claim 20, wherein the reflector has a through-hole at a rotational axis thereof, and a feed line extending from the transmission/reception system to the primary radiator is passed from the transmission/reception system to the primary radiator through the through-hole.

* * * * *